United States Patent [19]

Gietman, Jr.

[11] Patent Number: 4,889,522
[45] Date of Patent: Dec. 26, 1989

[54] ROTARY BAG MAKING MACHINE FOR DRAWSTRING BAGS

[75] Inventor: Peter J. Gietman, Jr., Combined Locks, Wis.

[73] Assignee: Custom Machinery Design, Inc., Appleton, Wis.

[21] Appl. No.: 270,235

[22] Filed: Nov. 14, 1988

[51] Int. Cl.[4] ............................................. B31B 1/64
[52] U.S. Cl. ................................... 493/193; 219/243; 493/205
[58] Field of Search ............... 493/193, 205, 208, 225, 493/470; 156/359; 219/243, 483, 484, 534, 539, 548

[56] References Cited

U.S. PATENT DOCUMENTS

| | | | |
|---|---|---|---|
| 2,169,936 | 8/1939 | Wagner | 156/200 |
| 4,567,984 | 2/1986 | Gietman | 206/390 |
| 4,642,084 | 2/1987 | Gietman | 493/190 |
| 4,649,259 | 3/1987 | Zurn | 219/243 |
| 4,664,649 | 5/1987 | Johnson et al. | 493/197 |

FOREIGN PATENT DOCUMENTS 177311  10/1983  Japan ..................... 156/359

OTHER PUBLICATIONS

Information Brochure-"Drawstring Bags from PE Film with Ribbon of HDPE" Windmoller & Holscher GmbH Bielefeld, updated.

Primary Examiner—Robert P. Olszewski
Assistant Examiner—Jack W. Lavinder
Attorney, Agent, or Firm—John C. Cooper, III

[57] ABSTRACT

The rotary bag making machine of the present invention is adapted to make side seal bags having a plastic drawstring through a hem in the top of the bag. More specifically. The rotary bag machine of the present invention includes a two part, elongate sealing bar having sealing edges, the first part of which is heated to a first temperature for sealing two layers of plastic bag material and the second part of which is heated to a second higher temperature for sealing the six layers which are present when hems are formed with inserted drawstrings. The second part of the seal bar is not only designed to form the seal but to heat weld together the drawstring plastic so that it will not separate or tear apart when the bag is gathered and subsequently tied with the drawstring.

9 Claims, 1 Drawing Sheet

ROTARY BAG MAKING MACHINE FOR DRAWSTRING BAGS

BACKGROUND OF THE INVENTION

1. Field of the Invention

The present invention relates generally to the art of bag making machinery, particularly to those rotary bag making machines which employ a rotary seal drum having one or more seal bars mounted thereon for sealing layers of plastic together to form bags. Still more specifically, the present invention relates to a rotary bag making machine which is adapted to form drawstring bags. Drawstring or draw tape may be used and the term "drawstring" is used to describe either in this specification.

2. Description of the Prior Art

Plastic bag machines have been known for a number of years, and the popularity of plastic bags for use as can liners, trash containers and for other use is well known. As of the time of the present invention, two main categories of plastic bag making equipment were in commercial use. The first type of bag making machine can be referred to as a shuttle type machine, in which the work piece (bag film material) is conveyed along a work surface to a location where it is to be sealed. When a seal is desired, a heated sealing bar is lowered to sandwich the plastic film between the bar and an anvil, a process which necessarily involves stopping the film, even if only very briefly. Dancer rolls and other complex devices accommodate the stop and start or jerky motion and precision work is quite difficult. Because of the sealing technique involved, the machines run at relatively slow speeds, e.g. 180 cycles per minute or less. With the average side sealed bag being 18" (between seals) the film speed of shuttle machine would be 270 feet per minute or less. These types of machines are known for making side or bottom sealed plastic bags.

The second type of bag machine known to the art is the rotary machine exemplified by the machines disclosed in U.S. Pat. No. 4,567,984 issued on Feb. 4, 1986 to Peter J. Gietman and entitled "Plastic Bag Package" and in its divisional U.S. Pat. No. 4,642,084 entitled "Plastic Bag Making Machine" and issued Feb. 10, 1987. Both patents are assigned to the assignee of the present invention. These devices include a rotary drum constructed of a plurality of slats and also includes a gear mechanism adapted for infinite variation of the drum diameter between a first smallest diameter and a second larger diameter. A sealing blanket is provided for the drum and is automatically adjusted for different drum diameters to provide proper tension against the film as it passes around the expandable drum. The patent discloses a mechanism for adjusting the diameter of the drum to facilitate the manufacture of a large number of different sized bottom and side seal bags of for insuring the correct drum diameter for a particular sized bag.

The seal bar(s) of the Gietman '984 and '084 machine comprise elongate metal sealing bars which are heated to the desired temperature and which may be spaced at various locations about the drum. For example, if two heating bars are employed, they are spaced 180° from each other on opposite sides of the drum, and two bags may be made for each drum revolution. Depending upon whether certain seal bars are activated, and how many are employed, a huge variety of bag sizes can be made on the patented machine.

The assignee of the Gietman patents also owns a pending U.S. patent application, Ser. No. 07/194,654, filed on May 16, 1988, for "Bag Making Apparatus With Automatic Compensation System". In this application, a machine is disclosed which in many respects is similar to the aforementioned Gietman device, except that means are provided for adjusting drum diameter while the machine is operating. The machine can accordingly be used to make a variety of bags, including those of varying size and bags with other features such as printing, hand holes, other die cuts, etc.

In a preferred embodiment of the latter type of machine a once longitudinally folded strip of plastic film is fed to the sealing drum-blanket portion of the machine and seals are made transversely across the folded strip to form side seal bags. Marks provided on the film are photoelectrically sensed by the machine and a comparator causes adjustment of the drum diameter to ensure that the seals are being provided at the exact location from the print registration.

It is also known in the art that drawstring type bags may be made, and up to the present time have been made principally on the shuttle type machines described previously. A brochure describing such a system is entitled "Drawstring Bags from PE film with ribbon of HDPE" published by Windmoller & Holscher GmbH of Bielfield, West Germany. In this machine, a drawstring insertion system, such as the one patented and manufactured by AMI, Inc. of Doraville, Georgia is used to insert a tape made from high density polyethylene in an inwardly folded hem of a once longitudinally folded strip of polyethylene film. The system is described in U.S. Pat. No. 4,664,649 issued May 12, 1987 to Johnson, et al for "Method And Apparatus For Producing Drawstring Bags".

It will be appreciated by one familiar with such equipment that the sealing mechanism will encounter a six layer situation which can be described as follows: (1) lower outer bag layer (2) drawstring tape, (3) lower hem, (4) upper hem, (5) upper drawstring tape and (6) upper outer bag layer. With shuttle type bag machines it is necessary to seal (and in some cases burn through) the six layer sandwich so that the bag is formed and the tape ends are heat welded to one another. The sealing bar must heat the very thin bag material and the typically thicker and higher density tape material in such a way that the final product meets established standards, and the process is necessarily slower than desirable. While it is known that rotary bag machines can be run up to several hundred feet per minute faster than shuttle type machines, the increased speed of rotary machines would make it difficult to achieve the desirable welding of the six layer sandwich if conventional rotary equipment were to be used for drawstring bags. A rotary bag machine which is modified for rapidly producing exceptional quality drawstring bags would represent a significant advance in the art.

OBJECTS AND SUMMARY OF THE INVENTION

It is a principal object of the present invention to provide a rotary drawstring bag machine which is capable of rapidly producing side seals and the required sealing of the above-mentioned six-layer film sandwich.

Another object of the present invention is to provide a sealing bar for rotary bag making equipment which includes first and second portions, and in which separate heating controls are provided for each portion so that different temperatures can be provided when drawstring bags are to be produced.

A further object of the present invention is to provide a drawstring bag machine which is faster than shuttle type drawstring bag machines.

A different object of the present invention is to provide a rotary bag making machine which may be used to produce drawstring and non-drawstring type bags.

Another object of the present invention is to provide a rotary drawstring bag machine having improved reliability in connection with the various seals and welds which must be produced during the bag making process.

A still further object of the present invention is to provide a seal bar which may be employed on shuttle type bag making machines as well as on rotary machines.

How these and other objects of the invention are accomplished will be described in the following detailed description of the preferred embodiment, taken in conjunction with the drawings. Generally the objects are accomplished by employing a seal bar which has separate electrical heating elements at first and second end portions of the elongate bar. Thermostatic controls are provided for the respective heating elements so that the first and second end portions of the seal bar can be heated to different temperatures, e.g. about 600° F. for the hotter end (for the six-layer sandwich) and about 475° F. for the side sealing end portion. Numerous variations of the present invention will become apparent to those skilled in the art after the present specification has been read and understood. Such variations are deemed to fall within the scope of the present invention if they fall within the scope of the claims which follow or the equivalents thereof.

DESCRIPTION OF THE DRAWINGS

In the FIGURES, like reference numerals are employed to illustrate like components.

DESCRIPTION OF THE PREFERRED EMBODIMENT

The present invention is best understood when it is read in conjunction with the disclosures of the two Gietman patents previously mentioned and in conjunction with the disclosure of the pending application. All of such disclosures are expressly incorporated herein by this reference. It would not facilitate understanding of the present invention to describe in detail how rotary bag machines work as that information is now in the public domain. What should be appreciated at the outset, however, is that the invention to be described here may be employed in those rotary-type machines. It should also be made clear a the outset that all of the accessories and special features of the machines previously described can be used with the present invention, including: manual or automatic drum diameter change means; drum blankets with adjustable tension; film registration techniques; perforations between seals; partial perforation/cutting to facilitate one at a time dispensing if a core or coreless winder is employed; die cutting equipment for cutting hand holes or drawstring grasping holes, and the like. It will then be appreciated that the basic principles of the invention may be variously embodied and adapted by one skilled in the art to the rotary type bag machines.

Another example of the adaptability of the present invention is shown in one of the drawings where the layers of plastic film to be sealed are heat welded together along parallel and spaced apart lines and a perforating device is used to perforate the plastic between the adjacent seals. The sealed and perforated material can then be wound into a roll. If the sealed bags are also cut along a portion of the perforated line, a one-at-a-time dispensing system results. When such devices are used for drawstring bags, it will be appreciated that by using present invention, the desired amount of heat will be produced at different locations along the length of the seal or heating bar, to account for the different amounts of heat necessary to seal two or six layers of plastic.

Figure 1:
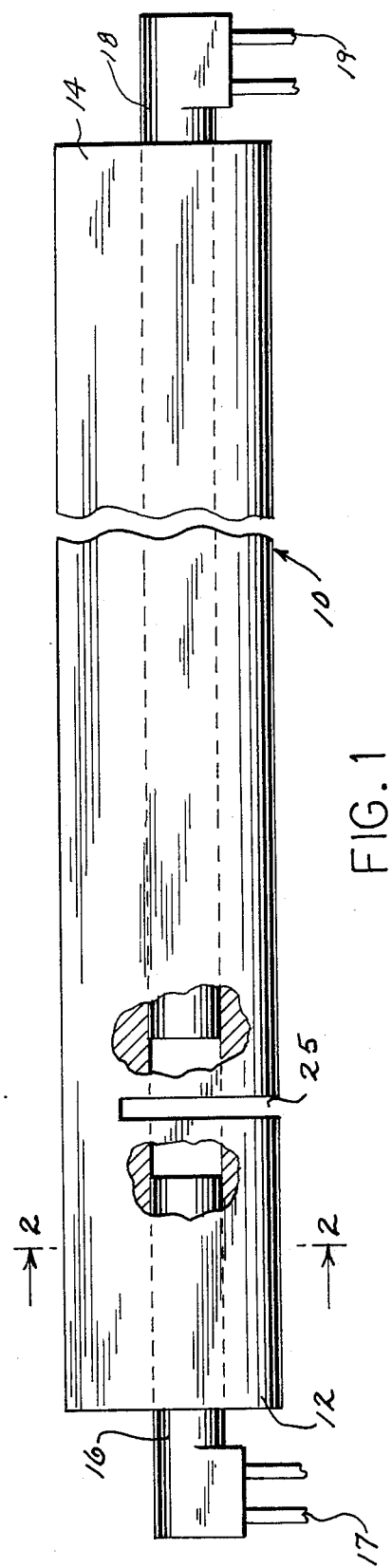
FIG. 1 is a side elevational view of a heating bar useful in the present invention, with parts of the electrical system being omitted for purposes of clearly portraying the invention.

Reference now can be made to FIG. 1 which shows in side elevation view, an elongate heating bar 10 which includes a first end portion 12 and a remaining body portion 14. Protruding from end portion 12 is a heating element 16 which is coupled by lead wires 17 to a suitable controller (not shown). Likewise, protruding from portion 14 is a separate heating element 18 coupled by lead wires 19 to a separate and distinct controller (not shown).

Figure 2:
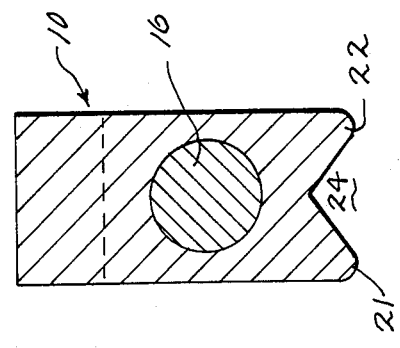
FIG. 2 is a cross-sectional view of the heating bar of FIG. 1, taken along the line 2—2 thereof.

As shown in FIG. 2, the heating bar 10 includes a pair of parallel and spaced apart sealing edges 21 and 22 having a raised area 24 therebetween. This configuration is especially useful where side seal bags are to be prepared and where it is desirable to perforate the plastic between the parallel seals. The space 24 allows ample room or such perforations. Again it should be emphasized that a single edge could be employed for sealing bar 10, instead of the parallel edge structure shown in the preferred embodiment.

The heating bar 10 is typically prepared from a heat conducting metal or alloy, such as aluminum, and includes a thin cut-out portion 25 separating portions 12 and 14. The portion 25 may be on the order of ⅛" or larger. Heating rods 16 and 18 terminate within portions 12 and 14 respectively a short distance to the left and right of the slot 25.

Figure 3:
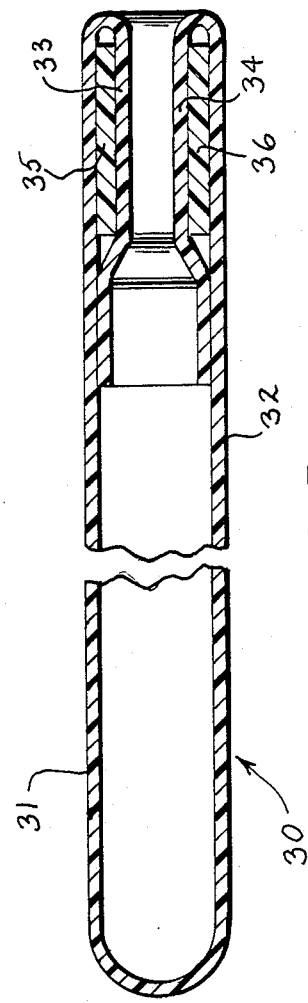
FIG. 3 is an illustration of a film-drawstring sandwich, such as the one provided by the aforementioned AMI equipment, shown in longitudinal cross-section.

Referring next to FIG. 3, a cross-section schematic of a drawstring bag sandwich is shown at 30. The bag includes upper and lower outside walls 31 and 32, upper and lower inner hem walls 33 and 34 and upper and lower drawstring tapes 35 and 36 disposed within the upper and lower hems. Typically, the hem is about 2 inches wide and it will easily be appreciated from FIG. 3 that 4 layers of plastic (31, 32, 33 and 34) exist for some of the hem width, while six layers (the foregoing plus tape 35 and 36 which are usually a tough high density polyethylene) are present for the remainder of the widths. Such high density materials usually have a melting point higher than that of the resins used for the bag itself. It is imperative for proper sealing that tape pieces 35 and 36 be welded together by bar 10.

In the illustrated embodiment then, body portion 12 is approximately 2 inches long and is heated to about 600° F. when used in rotary bag making machinery producing bags at a rate of about 400–450 feet per minute. A lower temperature, about 475° F. is used for body portion 14 which has any desired length.

The heating bar 10 allows rotary bag making machinery to rapidly and accurately perform the sealing operations required for drawstring bags. Speeds nearly double those previously obtainable with prior art equipment have been achieved with the rotary bag machines of the Gietman-type, equipped with the dual temperature heating bar.

While the present invention has been described in connection with a preferred embodiment, it is not to be limited thereby, but it is to be defined by the claims which follow.

What is claimed is:

1. An improved sealing bar for a bag making machine adapted to perform a heat sealing operation on plastic film material along a line and wherein the sealing temperature is preferably different at different locations along said line, said sealing bar being non-rotative and comprising an elongate member having first and second portions each portion respectively defining a hollow bore along its length and means disposed in the respective hollow bores for independently heating said portions of said bar, and control means for each of said heating means.

2. The invention set forth in claim 1 wherein said sealing bar comprises a first end portion and a second portion extending the length of said sealing bar except for said first position.

3. The invention set forth in claim 2 wherein said first and second portions define a transversely disposed cutout portion for physically separating the first and second portions from one another.

4. The invention set forth in claim 1 wherein said sealing bar contains two spaced apart, parallel sealing edges along its length.

5. An improved sealing bar for a rotary bag machine adapted to perform side sealing operations on a film web which includes along one side a paid of folded hems containing drawstring plastic tape material, said sealing bar being non-rotative and having a first hollow end portion adapted to seal the folded hems and including first internally disposed means for heating said first end portion and a first control means for said heating means for providing a first temperature to said first end portion, a second hollow end portion comprising the remaining length of said sealing bar and including a second internally disposed means for heating said remaining length, and a second control means for providing a second lesser temperature to said remaining portion.

6. The sealing bar of claim 5 wherein said first end portion is spaced apart from said remaining length.

7. The sealing bar of claim 5 wherein said sealing bar includes two parallel spaced apart sealing edges and wherein said heating means and control means are adapted to provide a higher temperature along the spaced apart edges of said first end portion and the lesser temperature along the spaced apart edges of said second portion.

8. The sealing bar of claim 5 wherein said sealing bar contains a first bore for receiving therein said first heating means and a second bore for receiving therein said second heating means.

9. The sealing bar of claim 8 wherein said sealing bar includes two parallel spaced apart sealing edges and wherein said heating means and control means are adapted to provide a higher temperature along the spaced apart edges of said first end portion and the lesser temperature along the spaced apart edges of said second portion.

* * * * *